Aug. 27, 1968    J. C. LITTMANN    3,398,992

BRAKE CONTROL SYSTEM FOR HYDRAULIC BRAKES

Filed March 30, 1966

INVENTOR.
JOSEPH C. LITTMANN
BY *Whittemore,*
*Hulbert & Belknap*
ATTORNEYS

United States Patent Office 3,398,992
Patented Aug. 27, 1968

3,398,992
BRAKE CONTROL SYSTEM FOR
HYDRAULIC BRAKES
Joseph C. Littmann, Grosse Pointe Woods, Mich., assignor to Ferro Manufacturing Corporation, Detroit, Mich., a corporation of Michigan
Filed Mar. 30, 1966, Ser. No. 538,776
7 Claims. (Cl. 303—20)

The present invention relates to a brake control system for hydraulic brakes on a trailer.

It is an object of the present invention to provide a system including a motor driven pump, a solenoid operated pressure control valve, a variable resistance responsive to variations in the braking force applied to the tractor effective to regulate the pressure control valve and effective to control energization of the pump motor.

It is a further object of the present invention to provide a system as described in the preceding paragraph in which the variable resistance means comprises a stack of carbon plates, and means for subjecting the stack of plates to pressure variable in accordance with the instantaneous pressure in the hydraulic system of the tractor brakes.

It is a further object of the present invention to provide a resistance variable in accordance with variations in fluid pressure comprising a cylinder having means for connecting one end thereof to a source of variable fluid pressure, a contact element in the opposite end of the cylinder, a piston movable in the cylinder and subjected to fluid pressure, and a stack of carbon plates interposed between the piston and the contact element.

Other objects and features of the invention will become apparent as the description proceeds, especially when taken in conjunction with the accompanying drawing, illustrating a preferred embodiment of the invention, wherein.

Figure 1:
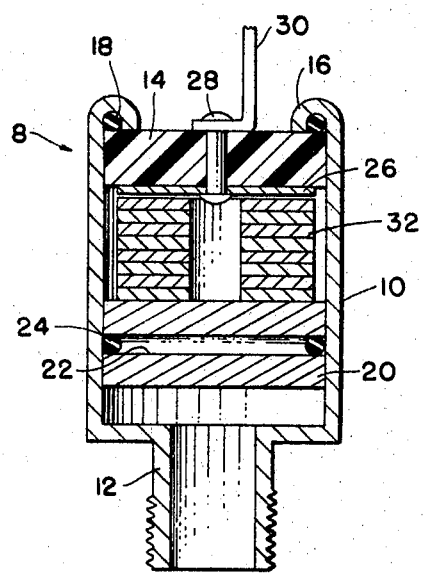
FIGURE 1 is a longitudinal sectional view through a variable resistance.

Referring first to FIGURE 1, the variable resistance 8 comprises a cylinder 10 having a threaded nipple 12 at one end for connection to a hydraulic system. The opposite end of the cylinder 10 is provided with an insulating block 14 retained in position by a reversely turned end 16 of the cylinder sealed by suitable means such for example as the gasket 18. Movable intermediate the ends of the cylinder is a free piston 20 having an annular groove 22 carrying suitable sealing means such for example as the O-ring 24.

Carried by the insulating block 14 is an electrical contact plate 26 insulated from the wall of the cylinder and connected through a rivet 28 to an external contact 30 which may be used to connect the variable resistance in a circuit. The variable resistance is intended for operation in a low voltage system which will normally be grounded through the cylinder.

Interposed between the piston 20 and the contact plate 26 is a stack of carbon plates or discs 32. In the specific embodiment illustrated the plates are of annular shape having a central opening providing clearance for the head of the rivet 28. It will be observed that in the absence of fluid pressure in the lower end of the cylinder 10, the uppermost of the carbon plates is separated from the contact 26 so that upon an increase in pressure below the piston 22, a circuit is first closed through the stack of carbon plates and the resistance thereafter decreases in accordance with well known principles as pressure on the carbon pile increases.

Figure 2:
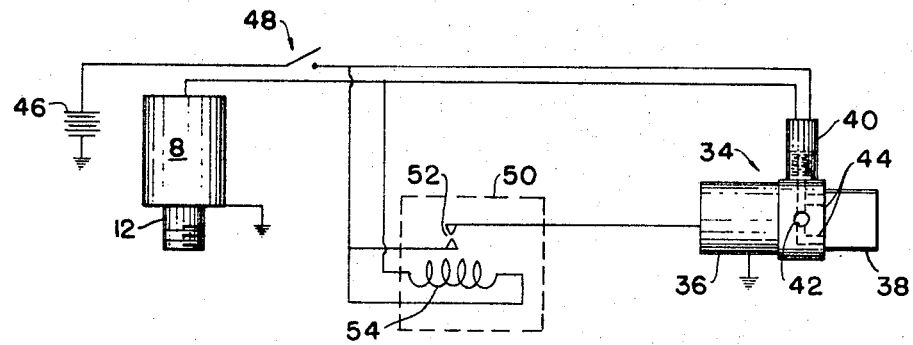
FIGURE 2 is a diagram showing the association of the variable resistance in a brake control system.

The variable resistance 8 described in the foregoing is intended primarily for use in a brake control system illustrated in FIGURE 2. In this system there is provided a unitary pump motor, pressure regulating valve and reservoir assembly 34 which is the subject of copending Pickles et al. application Ser. No. 539,710, filed Apr. 4, 1966, details of which form no part of the present invention. However, for a complete understanding of the present invention it will be noted that the assembly 34 includes a motor and pump 36, a reservoir 38, pressure regulating valve means including and actuating solenoid 40, an outlet port 42, and valve controlled inlet and exhaust passages 44 communicating with the reservoir. The system is operated from the usual vehicle battery 46 through a switch 48 adapted to be closed on initial movement of the brake pedal of the towing vehicle or tractor. The motor 36 is connected through a relay 50 having normally open contacts 52 and a coil or winding 54 to the battery 46. The coil 54 of the relay 50 is in series with the variable resistance 8 and the circuit to the winding of the solenoid 40 is also in series with the variable resistance 8. The nipple 12 of the variable resistance 8 is connected by suitable conduit means to the hydraulic system of the tractor or towing vehicle so that it is subjected to the instantaneous pressure existing in the hydraulic brake system thereof. The outlet port 42 of the assembly 34 is connected to the hydraulic pressure system of the trailer and controls the pressure of the trailer system at a value dependent upon the voltage applied to the windings of the solenoid 40.

When the brake of the towing vehicle is not applied, the switch 48 is open and the circuit is completely de-energized. When however, the driver of the towing vehicle depresses the brake, switch 48 is closed. As soon as pressure in the cylinder 10 builds up to a predetermined minimum value the uppermost element of the carbon pile 32 engages the contact plate 26 and parallel circuits are completed to the winding of the solenoid 40 and to the coil 54. At this time however, the relatively high resistance of the variable resistance 8 prevents closure of the relay contacts 52 so that the motor 36 is not energized. At some predetermined minimum hydraulic pressure in the tractor brake system, the resistance of the variable resistance 8 decreases to a value, as for example about 50 p.s.i., such that contacts 52 close, starting the motor 36 and driving the associated pump. At this time fluid will be supplied to the outlet port 42 which is connected to the trailer brake system at a pressure dependent upon the voltage applied to the winding of the solenoid 40. Thereafter, the pressure of fluid in the trailer brake system is variable in accordance with the pressure applied to the carbon pile 32 which in turn is variable in accordance with the hydraulic pressure of the fluid in the brake system of the tractor or towing vehicle.

The drawing and the foregoing specification constitute a description of the improved brake control system for hydraulic brakes in such full, clear, concise and exact terms as to enable any person skilled in the art to practice the invention, the scope of which is indicated by the appended claims.

What I claim as my invention is:

1. A brake control system for hydraulic brakes on a trailer connected to a towing vehicle or tractor having a hydraulic braking system independent of the trailer braking system, said brake control system comprising a source of hydraulic fluid under pressure, a pressure regulating valve controlling the pressure of fluid delivered from said source, a solenoid connected to said valve, a source of electrical current connected to the winding of said solenoid, and variable resistance means responsive to variations in the brake force applied to the tractor in series with said solenoid winding.

2. A brake control system as defined in claim 1 in which said variable resistance comprises a carbon pile made up of a series of flat carbon elements, a piston and cylinder device connected to the hydraulic system of the tractor brakes, means for applying the pressure developed in said piston and cylinder device to said carbon pile.

3. A brake control system as defined in claim 1 in which said source of hydraulic fluid under pressure comprises a pump, an electric motor connected to said pump, a relay controlling said motor, said relay having a coil in series with said variable resistance effective to energize said motor only on attainment of a predetermined pressure in the hydraulic system of the tractor brake.

4. A brake control system as defined in claim 2 in which said source of hydraulic fluid under pressure comprises a pump, an electric motor connected to said pump, a relay controlling said motor, said relay having a coil in series with said variable resistance effective to energize said motor only on attainment of a predetermined pressure in the hydraulic system of the tractor brake.

5. A brake control system for hydraulic brakes on a trailer connected to a towing vehicle or tractor having a hydraulic braking system independent of the trailer braking system, said brake control system comprising a source of hydraulic fluid under pressure, a pressure regulating valve controlling the pressure of fluid delivered from said source, a solenoid connected to said valve, a source of electrical current connected to the winding of said solenoid, and variable resistance means responsive to variations in the brake force applied to the tractor in series with said solenoid winding, said variable resistance comprising a cylinder, a piston in said cylinder, means on said cylinder for connecting one end thereof to the hydraulic brake system of the tractor, an insulated contact element at the other end of said cylinder, and a stack of carbon plates intermediate said piston and contact element.

6. A brake control system as defined in claim 5 in which the carbon plate adjacent said contact element is separated therefrom when the fluid pressure in said cylinder is below a predetermined value.

7. A brake control system as defined in claim 6 in which said source of hydraulic fluid under pressure comprises a pump, an electric motor connected to said pump, a relay controlling said motor, said relay having a coil in series with said variable resistance effective to energize said motor only on attainment of a predetermined pressure in the hydraulic system of the tractor brake.

References Cited

UNITED STATES PATENTS

| 2,012,747 | 8/1935 | Logan | 303—20 X |
| 2,330,739 | 9/1943 | Piron | 303—20 X |
| 2,344,902 | 3/1944 | Sexton | 303—20 |

DUANE A. REGER, *Primary Examiner.*